H. W. SCHATZ.
VARIABLE SPEED MECHANISM.
APPLICATION FILED MAR. 14, 1910.
983,252.
Patented Jan. 31, 1911.
2 SHEETS—SHEET 1.
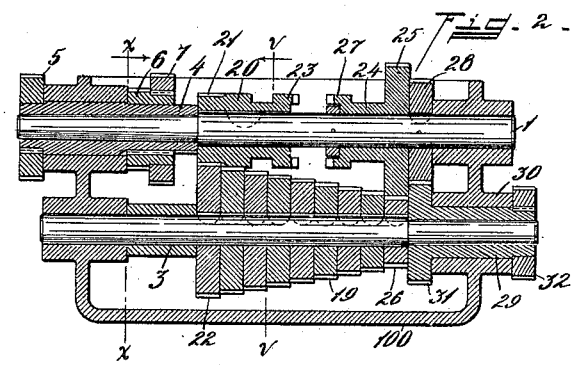
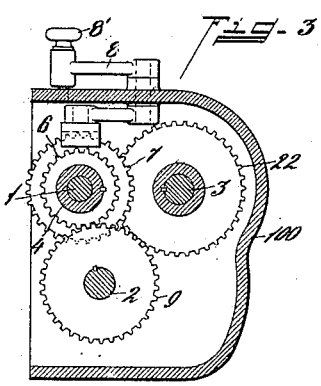
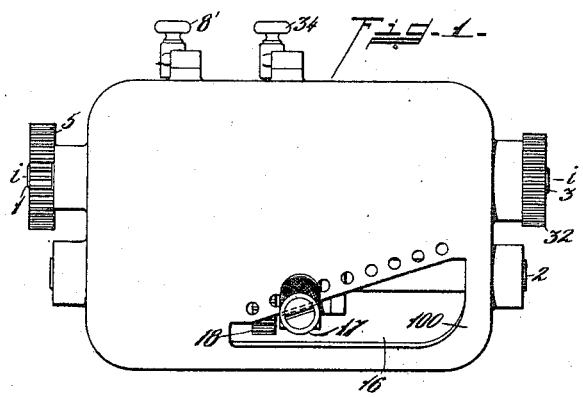
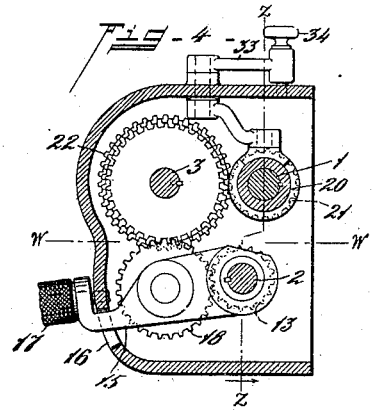
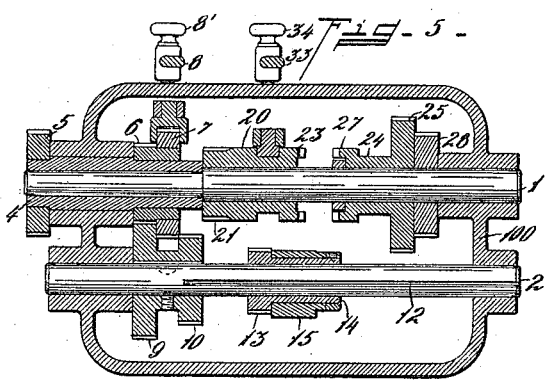
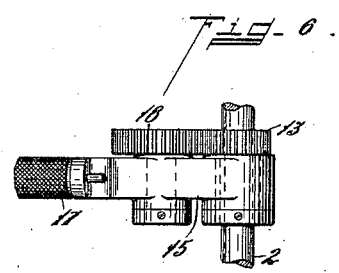
Witnesses
Inventor
Herman W. Schatz
By Wood & Wood
Attorneys H. W. SCHATZ.
VARIABLE SPEED MECHANISM.
APPLICATION FILED MAR. 14, 1910.
983,252.
Patented Jan. 31, 1911.
2 SHEETS—SHEET 2.
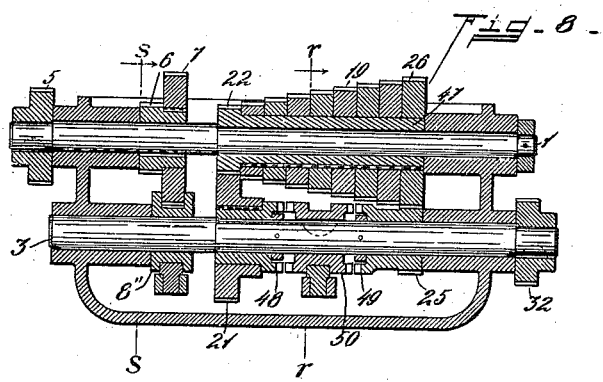
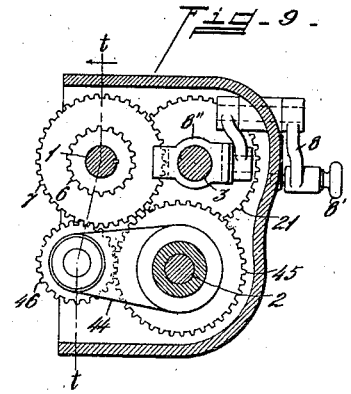
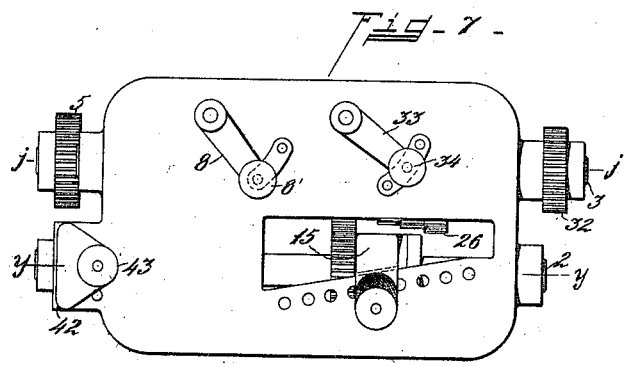
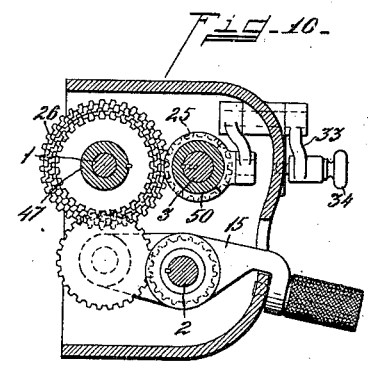
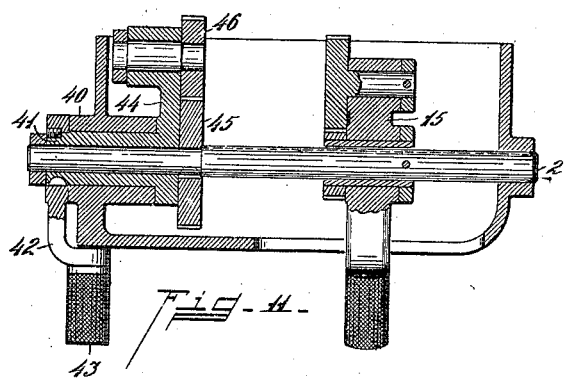
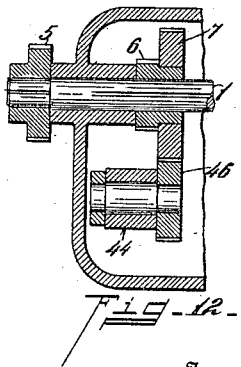
Witnesses
Oliver B. Kaiser
Inventor
Herman W. Schatz
By Wood & Wood
Attorneys

UNITED STATES PATENT OFFICE.

HERMAN W. SCHATZ, OF CINCINNATI, OHIO, ASSIGNOR TO THE AMERICAN TOOL WORKS COMPANY, OF CINCINNATI, OHIO, A CORPORATION OF OHIO.

VARIABLE-SPEED MECHANISM.

983,252. Specification of Letters Patent. Patented Jan. 31, 1911.

Application filed March 14, 1910. Serial No. 549,214.

*To all whom it may concern:*

Be it known that I, HERMAN W. SCHATZ, a citizen of the United States, residing at Cincinnati, in the county of Hamilton and State of Ohio, have invented certain new and useful Improvements in Variable-Speed Mechanism, of which the following is a specification.

My invention relates to a variable speed device.

The object of my invention is to provide a three shaft speed or feed box, two of the members of which are connected by a conventional cone and tumbler gear system, the first and second shafts, and the second and third shafts being respectively connected with the speed variating gear mechanism, each adapted to multiply the speed effects derivable from the cone and tumbler gear system.

The features of the invention are more fully set forth in the description of the accompanying drawings, forming a part of this invention, in which:—

Figure 1 is a front elevation of the feed box. Fig. 2 is a horizontal section on line *i, i*, Fig. 1. Fig. 3 is a section on line *x, x*, Fig. 2. Fig. 4 is a section on line *v, v*, Fig. 2. Fig. 5 is a section on line *z, z*, Fig. 4. Fig. 6 is a detail top plan view of the tumbler lever along line *w, w*, Fig. 4. Fig. 7 is a front elevation of a modified form of feed box. Fig. 8 is a horizontal section on lin *j, j*, Fig. 7. Fig. 9 is a section on line *s, s*, Fig. 8. Fig. 10 is a section on line *r, r*, Fig. 8. Fig. 11 is a section on line *y, y*, Fig. 7. Fig. 12 is a detail section on line *t, t*, Fig. 9.

The drawings illustrate two different specific embodiments of the invention, the only difference between which consists in a transposition of the cone of gears and tumbler mechanism and the making of some of the gears loose in one instance, and fixed in the other, relative to their respective shafts.

I will first describe the embodiment illustrated in Figs. 1 to 6. 100 represents the speed or feed box formed with suitable bearings for the shafts 1, 2, and 3. 4 represents the driving sleeve loosely mounted on one end of box 100, forming a bearing for shaft 1, the front end of said sleeve projected outside of the box. 5 is a driving gear fixed on the outside end of sleeve 4. 6, 7, represent a compound gear splined on the inner end of sleeve 4, so as to turn therewith and slide thereon. 8 represents a rock lever fulcrumed on top of box 100, the outer end having a detent pin handle 8', the inner end engaging the sides of the compound gear member 7, for shifting the same. 9, 10 represent a coöperating compound gear member fixed on shaft 2, the gear components being separated, so that gear 6 may be slid into engagement with gear 9, or gear 7 into engagement with gear 10. Shaft 2 has a keyway 12. 13 represents the tumbler pinion on shaft 2, having a key for the key-way and formed with a laterally extended hub 14, upon which is mounted the tumbler lever 15, said lever fulcruming on the hub 14. The front end of said tumbler 15 projects through an elongated slot 16, formed in the front wall of the box 100, and provided with a detent pin handle 17. 18 represents a transmitting gear on lever 15 intermeshing with the pinion 13, and adapted to engage a selected member of the cone of gears. 19 represents a conventional cone of gears fixed on shaft 3. 20 represents a sleeve splined on shaft 1, so as to slide thereon and turn therewith. On one end of the sleeve is formed the gear 21, adapted to slide into and out of mesh with the gear 22 of the cone. On the other end of sleeve 20 is formed the clutch member 23. 24 represents a sleeve loose on shaft 1; on one end of the sleeve is formed the gear 25 intermeshing with the gear 26 of the cone. On the other end of the sleeve 24 is formed the clutch member 27, adapted to coöperate with the clutch 23, to fix gear 25 to its shaft 1. 28 represents a gear fixed on shaft 1. 29 represents a sleeve loosely mounted on and forming a bearing for the rear end of the shaft 3, and journaled in the side 30, of the box 100. On the inner end of sleeve 29 is formed the gear 31, meshing with the gear 28. 32 represents a gear fixed on the outer end of the sleeve 29, from which motion is taken to drive the element whose speed is to be varied. 33 represents a rock lever fulcrumed on the top of the box 100, and provided with a manipulating pin detent handle 34, the inner end of said lever engaging the sleeve 20 for engaging and disengaging gears 21, 22, or clutch members 23, 27. By manipulating the lever 8, two speeds may be transmitted from the driving sleeve 4 to the tumbler shaft 2. From the tumbler shaft 2 as many speeds may be conveyed to the shaft 3 as there are steps in the cone. From the cone two speeds may be transmitted to the driven gear 31, by manipulating the handle 34. Thus, the second and third shafts bear the cone and tumbler gear system, the speeds between the primary driving member and second shaft may be multiplied, and the speed between the first shaft and the driven member may be multiplied, whereby the ultimate speed variations aggregate four changes of speed for each step of the cone.

In the modification shown in Figs. 7, 12, the driving gear 5 is fixed directly on the outer end of shaft 1. The compound gears 6, 7, are also fixed directly to shaft 1 internally of the box 100. 8 represents a rock lever on the front face of the box, provided with a handle 8', and a bracket 8", sliding on shaft 3, said lever being manipulated for laterally shifting the gears 6, 7, on shaft 1, so as to slide thereon. 40 is a bearing at one end of the box 100, in which is journaled a sleeve 41, projecting outside of the box, which sleeve is rocked by means of the lever 42, having the detent handle 43. On the inner end of sleeve 40 is a tumbling lever 44. 45 is a pinion fixed to shaft 2, concentric relatively to the bearing 40, and intermeshing with the tumbler gear 46, so that the latter may be intermeshed selectively with the gears 6, 7, as they are appropriately shifted on shaft 1. Figs. 9 and 12 show the tumbler gear 46 in mesh with gear 7. The tumbler mechanism for engaging the cone is also mounted on shaft 2, and is the same in elements and organization as the tumbler mechanism already described, except that the first tumbler is a lever fulcrumed at one end and the second tumbler lever is fulcrumed at an intermediate point. 47 is a sleeve loose on shaft 1, the cone of gears 19 being fixed to said sleeve. In this instance, the gears 21, 25, are loosely mounted on shaft 3 and they engage respectively with the gears 22, 26, of the cone. The gears 21, 25, have clutch members 48, 49, respectively, adapted to selectively engage with the clutch components of the double-faced clutch 50, which is fixed to turn with and slide on shaft 3. 33 is a rock lever for sliding the clutch member 50, operated by the detent pin member 34, projected upon the front face of the box. In this modification, the finally driven gear wheel 32 is fixed upon the outer end of shaft 3.

In operation, the gears 6, 7 may be slid on shaft 1, and the lever 42 rocked to bring the gear 46 into mesh with either of said gears 6, 7, so as to transmit two speeds from the first shaft to the second or tumbler shaft. The tumbling gear of the sliding tumbler 15 on shaft 2 may be engaged with any step of the cone, the cone rotating loosely on the shaft 1. By manipulating the clutch 50, the cone may be caused to drive the shaft 3 through either gear 21 or 25. Thus, in both modifications, two speeds may be had between the driving element and tumbler shaft, the sliding and rocking tumbler may be rocked selectively into the steps of the cone, and two speeds may be had between the cone and driven element, so that the speeds derivable from the cone and tumbler may be four times multiplied.

Having described my invention, I claim:—

1. In a variable speed device, a driving element, three shafts, a cone and tumbler gear system between two of said shafts, a first auxiliary variable speed gear mechanism between the driving element and first shaft, a second auxiliary variable speed gear system between the second and third shafts, whereby the variable speeds derivable from the cone and tumbler gear system may be multiplied by each of said auxiliary variable speed gear systems, and a driven wheel on the third shaft receiving each of the speeds derivable from the system.

2. In a variable speed device, three shafts, a cone and tumbler gear system on two of said shafts, a first auxiliary variable speed gear system for driving the second shaft, a second auxiliary variable speed gear system between the first and third shafts, and means for manipulating the movable elements of said gear systems, whereby two speeds may be transmitted to each gear of the cone and two transmitted between the cone and third shaft, aggregating an ultimate result of four speeds for each step of the cone.

3. In a variable speed device, two shafts, a cone of gears on one of said shafts, a pair of different diameter gears on the second shaft, means for alternately connecting said gears in driving connection with said cone and second shaft for driving said second shaft from the cone through either of said different diameter gears, a third gear fixed on said second shaft, and an intermeshing gear on the cone shaft receiving all of the speeds compounded from the cone.

In testimony whereof, I have hereunto set my hand.

HERMAN W. SCHATZ.

Witnesses:
  OLIVER B. KAISER,
  LUISE BECK.